US010962698B2

(12) United States Patent
Oowada et al.

(10) Patent No.: US 10,962,698 B2
(45) Date of Patent: Mar. 30, 2021

(54) INORGANIC POLARIZING PLATE

(71) Applicant: Dexerials Corporation, Tokyo (JP)

(72) Inventors: Masahiro Oowada, Tokyo (JP); Takahiro Kimura, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 15/542,302

(22) PCT Filed: Jan. 7, 2016

(86) PCT No.: PCT/JP2016/050371
§ 371 (c)(1),
(2) Date: Jul. 7, 2017

(87) PCT Pub. No.: WO2016/111333
PCT Pub. Date: Jul. 14, 2016

(65) Prior Publication Data
US 2018/0267221 A1 Sep. 20, 2018

(30) Foreign Application Priority Data

Jan. 8, 2015 (JP) .............................. JP2015-002536

(51) Int. Cl.
*G02B 5/30* (2006.01)
*G02F 1/1335* (2006.01)
(Continued)

(52) U.S. Cl.
CPC ......... *G02B 5/3058* (2013.01); *G02B 5/3033* (2013.01); *G02F 1/1335* (2013.01);
(Continued)

(58) Field of Classification Search
CPC .. G02B 5/3025; G02B 5/3033; G02B 5/3041; G02B 5/3058; G02B 1/10; G02B 1/105;
(Continued)

(56) References Cited

U.S. PATENT DOCUMENTS

2003/0072079 A1* 4/2003 Silverstein ........... G02B 5/3058
359/485.05
2007/0285777 A1 12/2007 Toyoshima
(Continued)

FOREIGN PATENT DOCUMENTS

| CN | 103323900 | 9/2013 |
|---|---|---|
| CN | 103323901 | 9/2013 |

(Continued)

OTHER PUBLICATIONS

The State Intellectual Property Office of People's Republic of China, Second Chinese Office Action issued in corresponding Chinese Application No. 201680004442.0, dated Oct. 21, 2019.
(Continued)

*Primary Examiner* — Derek S. Chapel
*Assistant Examiner* — Adam W Booher
(74) *Attorney, Agent, or Firm* — Carmody Torrance Sandak & Hennessey LLP

(57) ABSTRACT

Provided is inorganic polarizing plate, including in order of reciting: a substrate transparent to light in a bandwidth used; a first dielectric layer; a plurality of linear metal layers; a plurality of linear second dielectric layers; and a plurality of linear light absorbing layers, wherein the plurality of linear metal layers are arranged on the first dielectric layer at intervals shorter than a wavelength of the light, the plurality of linear second dielectric layers are arranged on the plurality of linear metal layers, respectively, the plurality of (Continued)

linear light absorbing layers are arranged on the plurality of linear second dielectric layers, respectively, and the inorganic polarizing plate includes a water repelling layer at peripheral ends of the inorganic polarizing plate at which longer-direction ends of the linear metal layers are present, to cover longer-direction ends of the linear metal layers, linear second dielectric layers, and linear light absorbing layers.

20 Claims, 15 Drawing Sheets

(51) Int. Cl.
    *G03B 21/14* (2006.01)
    *G03B 21/20* (2006.01)

(52) U.S. Cl.
    CPC ........ *G03B 21/14* (2013.01); *G02F 1/133548* (2021.01); *G03B 21/2073* (2013.01)

(58) Field of Classification Search
    CPC ... G02B 1/14; G02B 1/16; G02B 1/18; G02B 27/0006; G02F 1/1335; G02F 1/133528; G02F 2001/133545; G02F 2001/133548; G03B 21/14; G03B 21/2073
    See application file for complete search history.

(56) References Cited

U.S. PATENT DOCUMENTS

| | | | |
|---|---|---|---|
| 2008/0166549 A1* | 7/2008 | Shieh ................... | C09D 165/00 428/336 |
| 2010/0103517 A1* | 4/2010 | Davis ..................... | C23C 14/04 359/485.05 |
| 2013/0250411 A1* | 9/2013 | Bangerter ................ | G02B 5/30 359/483.01 |
| 2013/0250412 A1* | 9/2013 | Aota .................... | G02B 5/3058 359/485.05 |
| 2013/0286358 A1 | 10/2013 | Takahashi | |
| 2014/0063467 A1 | 3/2014 | Takahashi | |
| 2014/0234640 A1* | 8/2014 | Kohno ................... | B29C 41/24 428/452 |
| 2014/0287242 A1* | 9/2014 | Cleymans ............ | C08G 18/755 428/421 |

FOREIGN PATENT DOCUMENTS

| | | |
|---|---|---|
| JP | 2008216956 | 9/2008 |
| JP | 2010210829 | 9/2010 |

OTHER PUBLICATIONS

Office Action issued in corresponding Chinese Application No. 20168000044420, dated Feb. 19, 2019 with English Translation.

\* cited by examiner

125 ° or greater

|  | Contact angle of 30 ° or less | Contact angle of 90 ° or greater |
|---|---|---|
| Initially |  |  |
| Immediately after attachment |  |  |
| After 21 hours passed |  |  |

FIG. 19

INORGANIC POLARIZING PLATE

TECHNICAL FIELD

The present invention relates to an inorganic polarizing plate.

BACKGROUND ART

Polarizing plates configured to pass only light or waves polarized in a specific direction are used in, for example, liquid crystal displays.

As the polarizing plates, often used are polarizing films obtained by adsorbing iodine compounds to polyvinyl alcohol (PVA) films and subjecting the films to stretch orientation to develop a dichroic property for absorption of visible light. The polarizing films are interposed between transparent films of, for example, triacetyl cellulose (TAC) in order to secure mechanical strength, heat resistance, and humidity resistance, and further have hard coatings on the transparent films for protection from, for example, scratches and stain adhesion.

Of light components incident to the polarizing films, polarized light components that do not pass through the polarizing films are absorbed in the polarizing films and radiated to the outside of the polarizing films as heat. Therefore, when the polarizing films are irradiated with strong light, there is a problem that the temperatures of the polarizing films rise due to heat generation to degrade the polarizing property. The cause of this problem is essentially the heat resistance of the organic materials. Therefore, fundamental resolution of this problem is difficult.

Hence, as polarizing plates that can be used at places where the polarizing plates are required to have a high heat resistance, wire grid polarizing plates formed completely of inorganic materials are being studied. The wire grid polarizing plates have structures in which wire grids of fine metal wires having cycles equal to or shorter than the wavelengths of light are formed on the surfaces of the substrates (see, e.g., PTL 1).

In regard of the wire grid polarizing plates, liquid stains that adhere to the grid peripheral ends diffuse in the concaves in the wire grids due to capillary actions caused by the convexes and concaves in the grid structures, to degrade the optical properties of the wire grid polarizing plates.

Hence, the following polarizer is proposed (see, e.g., PTL 2). The polarizer has a first surface that is bordered at a peripheral portion, and includes a standard region and a rib-corrected region. The standard region has ribs having standard properties. The standard region is configured to polarize incident light. The rib-corrected region is provided between at least a portion of the standard region and the peripheral portion and along at least a portion of the peripheral portion of the substrate. The rib-corrected region has corrected ribs that are corrected to have properties different from the standard properties such that the capillary action in the rib-corrected region becomes substantially smaller than the capillary action in the standard region.

With a difference in the level of the capillary action between the corrected ribs and the ribs, this polarizer is intended to prevent intrusion of liquid stains into the ribs.

However, this proposed technique needs to produce the ribs and the corrected ribs, leading to a complicated production process. In addition, because the corrected ribs also have a capillary action, there is a problem that intrusion of liquid stains into the ribs through the corrected ribs cannot completely be prevented.

CITATION LIST

Patent Literature

PTL 1: Japanese Patent Application Laid-Open (JP-A) No. 2010-210829
PTL 2: JP-A No. 2013-218294

SUMMARY OF INVENTION

Technical Problem

The present invention aims to solve the various problems in the related art and achieve the object described below. That is, the present invention has an object to provide an inorganic polarizing plate that does not need a complicated production process and can suppress degradation of optical properties due to liquid stains that adhere to peripheral ends.

Solution to Problem

Means for solving the above problems are as follows.
<1> An inorganic polarizing plate, including in an order of reciting:
a substrate transparent to light in a bandwidth used;
a first dielectric layer;
a plurality of linear metal layers;
a plurality of linear second dielectric layers; and
a plurality of linear light absorbing layers,
wherein the plurality of linear metal layers are arranged on the first dielectric layer in a manner that the plurality of linear metal layers are spaced at intervals shorter than a wavelength of the light,
wherein the plurality of linear second dielectric layers are arranged on the plurality of linear metal layers, respectively,
wherein the plurality of linear light absorbing layers are arranged on the plurality of linear second dielectric layers, respectively, and
wherein the inorganic polarizing plate includes a water repelling layer at peripheral ends of the inorganic polarizing plate, the peripheral ends being peripheral ends at which longer-direction ends of the linear metal layers are present, the water repelling layer covering longer-direction ends of the linear metal layers, the linear second dielectric layers, and the linear light absorbing layers.
<2> The inorganic polarizing plate according to <1>, including
a third dielectric layer on facing side surfaces of the plurality of linear metal layers and on a surface of the first dielectric layer between the plurality of linear metal layers.
<3> The inorganic polarizing plate according to <1> or <2>,
wherein a material of the linear metal layers is any one selected from the group consisting of Al, Ag, Cu, Mo, Cr, Ti, Ni, W, Fe, Si, Ge, Te, and an alloy of 2 or more thereof.
<4> The inorganic polarizing plate according to any one of <1> to <3>,
wherein a material of the first dielectric layer and the linear second dielectric layers is any one of $SiO_2$ and $Al_2O_3$.
<5> The inorganic polarizing plate according to any one of <1> to <4>,
wherein a material of the linear light absorbing layers is any one selected from the group consisting of Ta, Al, Ag, Cu, Mo, Cr, Ti, W, Ni, Fe, Sn, Si, and an alloy of 2 or more thereof.

<6> The inorganic polarizing plate according to any one of <1> to <5>,
wherein a water contact angle of the water repelling layer is 90° or greater.
<7> The inorganic polarizing plate according to any one of <1> to <6>,
wherein a material of the water repelling layer is an organopolysilazane.
<8> The inorganic polarizing plate according to any one of <1> to <7>,
wherein a material of the substrate is any one selected from the group consisting of glass, quartz crystal, and sapphire.

Advantageous Effects of Invention

The present invention can solve the various problems in the related art, achieve the object described above, and provide an inorganic polarizing plate that does not need a complicated production process and can suppress degradation of optical properties due to liquid stains that adhere to peripheral ends.

BRIEF DESCRIPTION OF DRAWINGS

FIG. 19 is a picture illustrating a relationship among a cumulative irradiation time, a contact angle, and a capillary action.

Figure 1:
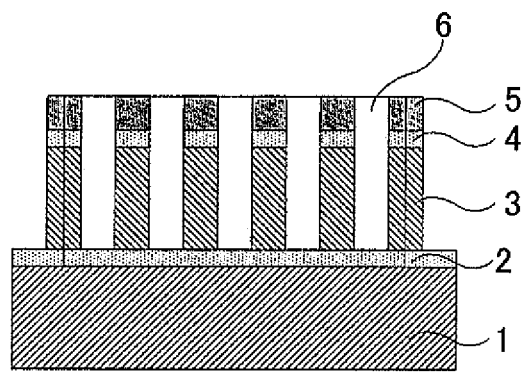
FIG. 1 is a schematic side view of an example of an inorganic polarizing plate of the present invention.

DESCRIPTION OF EMBODIMENTS (Inorganic Polarizing Plate)
An inorganic polarizing plate of the present invention includes at least a substrate, a first dielectric layer, a plurality of linear metal layers, a plurality of linear second dielectric layers, and a plurality of linear light absorbing layers in the order of reciting.

The inorganic polarizing plate includes a water repelling layer at peripheral ends of the inorganic polarizing plate, where the peripheral ends are peripheral ends at which the longer-direction ends of the linear metal layers are present.

The water repelling layer covers the longer-direction ends of the linear metal layers, the linear second dielectric layers, and the linear light absorbing layers.

The inorganic polarizing plate is a so-called wire grid polarizing plate.

The present inventors have found that an inorganic polarizing plate that includes at least a substrate, a first dielectric layer, a plurality of linear metal layers, a plurality of linear second dielectric layers, and a plurality of linear light absorbing layers in the order of reciting does not need a complicated production process, and has a good polarizing property. As a result of earnest studies in order to suppress degradation of optical properties due to liquid stains that adhere to peripheral ends, the present inventors have found that the inorganic polarizing plate that includes a water repelling layer at peripheral ends of the inorganic polarizing plate at which the longer-direction ends of the linear metal layers are present such that the water repelling layer covers the longer-direction ends of the linear metal layers, the linear second dielectric layers, and the linear light absorbing layers can suppress degradation of optical properties due to liquid stains that adhere to the peripheral ends. The present invention has been completed in this way.

<Substrate>

The material, shape, size, and structure of the substrate are not particularly limited and may be appropriately selected depending on the intended purpose so long as the substrate is transparent to light in a bandwidth used.

The light in a bandwidth used is not particularly limited and may be appropriately selected depending on the intended purpose. Examples of the light include visible light. Examples of the visible light include light of from 380 nm through 810 nm.

Transparency to the light in the bandwidth used does not mean a 100% transmittance. Therefore, the substrate needs only to be transparent in the range in which the inorganic polarizing plate serves its function.

The material of the substrate is not particularly limited and may be appropriately selected depending on the intended purpose. Preferable examples of the material of the substrate include glass, quartz crystal, and sapphire. Glass is more preferable in terms of costs and transmittance.

Furthermore, a material having a refractive index of from 1.1 through 2.2 is preferable as the material of the substrate.

The average thickness of the substrate is not particularly limited, may be appropriately selected depending on the intended purpose, and is preferably from 300 μm through 1,000 μm.

<First Dielectric Layer>

The first dielectric layer is formed on the substrate.

The material of the first dielectric layer is not particularly limited and may be appropriately selected depending on the intended purpose. Examples of the material of the first dielectric layer include $SiO_2$, $Al_2O_3$, and $MgF_2$. Among these materials, $SiO_2$ and $Al_2O_3$ are preferable.

The average thickness of the first dielectric layer is not particularly limited, may be appropriately selected depending on the intended purpose, and is preferably from 1 nm through 105 nm and more preferably from 35 nm through 105 nm in order to increase an interference effect.

The average thickness can be obtained by, for example, observation with a scanning electron microscope and observation with a transmission electron microscope. For example, thickness is measured at arbitrary 10 positions and the average thickness is obtained from the arithmetic mean of the measurements.

<Plurality of Linear Metal Layers>

In the inorganic polarizing plate, the plurality of linear metal layers are arranged on the first dielectric layer in a manner that the linear metal layers are spaced at intervals shorter than the wavelength of the light.

The material of the linear metal layers is not particularly limited and may be appropriately selected depending on the intended purpose. Preferable examples of the material of the linear metal layers in terms of pattern formation and optical properties include Al, Ag, Cu, Mo, Cr, Ti, Ni, W, Fe, Si, Ge, Te, and an alloy of 2 or more thereof.

The cross-sectional shape of the linear metal layers in a cross section taken orthogonally to the longer direction of the linear metal layers is not particularly limited and may be appropriately selected depending on the intended purpose. Examples of the cross-sectional shape of the linear metal layers include rectangles and trapezoids.

The average thickness of the linear metal layers is not particularly limited, may be appropriately selected depending on the intended purpose, and is preferably from 20 nm through 400 nm in terms of a polarizing property.

It is preferable that the average thickness of the linear metal layers be 50% or greater of the total of the average thickness of the linear metal layers, the average thickness of the second dielectric layers, and the average thickness of the linear light absorbing layers.

In the present specification, the average thickness of the linear metal layers is the arithmetic mean of heights of the metal layers in a cross-section taken orthogonally to the longer direction of the linear metal layers. The average thickness can be obtained by, for example, observation with a scanning electron microscope and observation with a transmission electron microscope. For example, the height is measured at arbitrary 10 positions and the average thickness is obtained from the arithmetic mean of the measurements.

The average width of the linear metal layers is not particularly limited, may be appropriately selected depending on the intended purpose, and is preferably from 20% through 60% of the average interval between the plurality of linear metal layers in terms of a polarizing property and process stability.

The average width of the linear metal layers can be obtained by, for example, observation with a scanning electron microscope and observation with a transmission electron microscope. For example, the width of 4 linear metal layers is measured at their arbitrary positions, and the average width is obtained from the arithmetic mean of the measurements. Note that the width is measured at the top level of the linear metal layers.

The average interval between the plurality of linear metal layers is not particularly limited, may be appropriately selected depending on the intended purpose, and is preferably from 100 nm through 200 nm in terms of ease of production and stability.

The average interval can be obtained by, for example, observation with a scanning electron microscope and observation with a transmission electron microscope. For example, the interval (pitch) of the linear metal layers is measured at arbitrary 4 positions, and the average interval is obtained from the arithmetic mean of the measurements. Note that the interval (pitch) is the distance measured for adjoining 2 linear metal layers, between a top edge of one of the linear metal layers at the other linear metal layer side and a top edge of the other of the linear metal layers at the side opposite to the one linear metal layer side.

<Plurality of Linear Second Dielectric Layers>

The plurality of linear second dielectric layers are arranged on the plurality of linear metal layers, respectively.

The material of the linear second dielectric layers is not particularly limited and may be appropriately selected depending on the intended purpose. Examples of the material of the linear second dielectric layers include $SiO_2$, $Al_2O_3$, and $MgF_2$. Among these materials, $SiO_2$ and $Al_2O_3$ are preferable.

The cross-sectional shape of the linear second dielectric layers in a cross section taken orthogonally to the longer direction of the linear second dielectric layers is not particularly limited and may be appropriately selected depending on the intended purpose. Examples of the cross-sectional shape of the linear second dielectric layers include rectangles and trapezoids.

The average thickness of the linear second dielectric layers is not particularly limited, may be appropriately selected depending on the intended purpose, and is preferably from 1 nm through 100 nm and more preferably from 3 nm through 80 nm in order to increase an interference effect.

The average thickness of the linear second dielectric layers can be obtained in the same manner as for obtaining the average thickness of the linear metal layers.

<Plurality of Linear Light Absorbing Layers>

The plurality of linear light absorbing layers are arranged on the plurality of linear second dielectric layers, respectively.

The linear light absorbing layers have a light absorbing function.

The light absorbing function means a function of attenuating a polarized wave (TE wave (S wave)) having an electric field component parallel with the grid formed in the inorganic polarizing plate. The linear light absorbing layers allow transmission therethrough of a polarized wave (TM wave (P wave)) having an electric field component perpendicular to the grid.

The material of the linear light absorbing layers is not particularly limited and may be appropriately selected depending on the intended purpose so long as the linear light absorbing layers have the light absorbing function. Examples of the material of the linear light absorbing layers include metals, semiconductors, and metal-containing semiconductors. Among these materials, any one of Ta, Al, Ag, Cu, Mo, Cr, Ti, W, Ni, Fe, Sn, Si, and an alloy of 2 or more thereof is preferable in terms of optical properties.

The linear light absorbing layers may have a single-layer structure or a multi-layer structure. For example, the linear light absorbing layers may include a single layer formed of a metal-containing semiconductor or include 2 layers formed of a metal or a semiconductor, and a metal-containing semiconductor.

The linear light absorbing layers having a 2-layer structure formed of a metal or a semiconductor and a metal-containing semiconductor can suppress reflection, improve transmittance, and increase contrast.

The average thickness of the linear light absorbing layers is not particularly limited, may be appropriately selected depending on the intended purpose, and is preferably from 1 nm through 100 nm, more preferably from 5 nm through 80 nm, and particularly preferably from 10 nm through 50 nm.

The average thickness of the linear light absorbing layers can be obtained in the same manner as for obtaining the average thickness of the linear metal layers.

<Water Repelling Layer>

The water repelling layer is formed at peripheral ends of the inorganic polarizing plate at which the longer direction ends of the linear metal layers are present. The water repelling layer covers the longer-direction ends of the linear metal layers, the linear second dielectric layers, and the linear light absorbing layers.

In the inorganic polarizing plate, the water repelling layer may also be formed at other portions in addition to the peripheral ends of the inorganic polarizing plate at which the longer-direction ends of the linear metal layers are present.

With the water repelling layer for covering the longer-direction ends of the linear metal layers, the linear second dielectric layers, and the linear light absorbing layers provided at the peripheral ends of the inorganic polarizing plate at which the longer-direction ends of the linear metal layers are present, the inorganic polarizing plate can prevent liquid stains from intruding from the longer-direction ends of the linear metal layers into between the linear metal layers (between grid portions of the wire grid) and further from diffusing in the wire grid due to a capillary action. As a result, the inorganic polarizing plate can suppress degradation of optical properties due to the liquid stains that adhere to the peripheral ends.

The inorganic polarizing plate can prevent liquid stains from intruding into between the linear metal layers (between grid portions of the wire grid) and further from diffusing in the wire grid due to a capillary action with the water repelling layer. Therefore, there is no need for producing corrected ribs and ribs as in the invention described in JP-A No. 2013-218294. Hence, the inorganic polarizing plate does not need a complicated production process.

The water repelling layer is not particularly limited and may be appropriately selected depending on the intended purpose so long as the water-repelling layer has water repellency, but it is preferable that a water contact angle of the water-repelling layer be 90° or greater. The water contact angle can be measured with, for example, a contact angle mater using pure water.

The material of the water repelling layer is not particularly limited and may be appropriately selected depending on the intended purpose so long as water repellency can be obtained. An organopolysilazane is preferable because of an excellent heat resistance.

The average thickness of the water repelling layer is not particularly limited and may be appropriately selected depending on the intended purpose.

<Other Members>

Examples of the other members include a third dielectric layer.

<<Third Dielectric Layer>>

The third dielectric layer is arranged on facing side surfaces of 2 linear meatal layers.

The third dielectric layer is arranged on the surface of the first dielectric layer between 2 linear metal layers.

With the third dielectric layer, the inorganic polarizing plate can be improved in resistance such as heat resistance and humidity resistance.

The material of the third dielectric layer is not particularly limited and may be appropriately selected depending on the intended purpose. Examples of the material of the third dielectric layer include $SiO_2$, $Al_2O_3$, and $MgF_2$. Among these materials, $SiO_2$ and $Al_2O_3$ are preferable.

The average thickness of the third dielectric layer is not particularly limited, may be appropriately selected depending on the intended purpose, and is preferably from 1 nm through 100 nm and more preferably from 3 nm through 80 nm.

An example of the inorganic polarizing plate of the present invention will be described with reference to the drawings.

FIG. 1 is a schematic side view of an example of the inorganic polarizing plate of the present invention.

Figure 2:
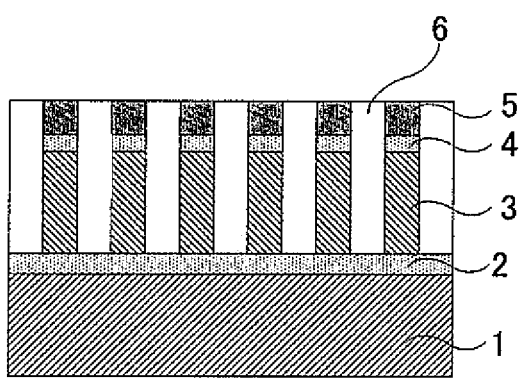
FIG. 2 is a schematic side view of another example of an inorganic polarizing plate of the present invention.

FIG. 2 is a schematic side view of another example of the inorganic polarizing plate of the present invention.

Figure 3:
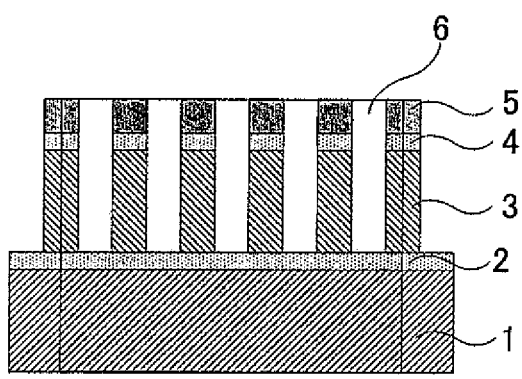
FIG. 3 is a schematic side view of another example of an inorganic polarizing plate of the present invention.

FIG. 3 is a schematic side view of another example of the inorganic polarizing plate of the present invention.

Figure 4:
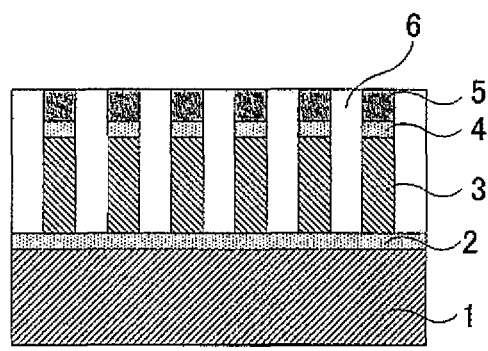
FIG. 4 is a schematic side view of another example of an inorganic polarizing plate of the present invention.

FIG. 4 is a schematic side view of another example of the inorganic polarizing plate of the present invention.

The inorganic polarizing plate of FIG. 1 to FIG. 4 includes a substrate 1, a first dielectric layer 2, a plurality of linear metal layers 3, a plurality of linear second dielectric layers 4, and a plurality of linear light absorbing layers 5 in the order of reciting.

The plurality of linear metal layers 3 are arranged on the first dielectric layer 2 in a manner that the linear metal layers 3 are spaced at intervals shorter than the wavelength of light.

The plurality of linear second dielectric layers 4 are arranged on the plurality of linear metal layers 3, respectively.

The plurality of linear light absorbing layers 5 are arranged on the plurality of linear second dielectric layers 4, respectively.

The inorganic polarizing plate includes a water repelling layer 6 at peripheral ends of the inorganic polarizing plate at which the longer-direction ends of the linear metal layers 3 are present. The water repelling layer 6 covers the longer-direction ends of the linear metal layers 3, the linear second dielectric layers 4, and the linear light absorbing layers 5.

At the peripheral ends of the inorganic polarizing plate at which the longer-direction ends of the linear metal layers 3 are present, the water repelling layer 6 needs not cover the longer-direction ends of the linear metal layers 3, the linear second dielectric layers 4, and the linear light absorbing layers 5 that are positioned at both ends of sides of the inorganic polarizing plate defining the peripheral ends as illustrated in FIG. 1. This is because there are cases where both ends of the sides of the inorganic polarizing plate are outside the region in which the polarizing function is utilized (hereinafter, this region may be referred to as "effective region"). That is, in the grid structure outside the effective region, the water repelling layer 6 needs not cover the longer-direction ends of the linear metal layers 3, the linear second dielectric layers 4, and the linear light absorbing layers 5 that are positioned at both ends of the sides of the inorganic polarizing plate defining the peripheral ends.

Needless to say, at the peripheral ends of the inorganic polarizing plate at which the longer-direction ends of the linear metal layers 3 are present, the water repelling layer 6 may cover also both ends of the sides of the inorganic polarizing plate defining the peripheral ends as illustrated in FIG. 2.

At the peripheral ends of the inorganic polarizing plate at which the longer-direction ends of the linear metal layers 3 are present, the water repelling layer 6 may cover a part of the substrate 1 as illustrated in FIG. 3, or may cover the entire surface of the substrate 1 as illustrated in FIG. 4.

At the peripheral ends of the inorganic polarizing plate at which the longer-direction ends of the linear metal layers 3 are present, the water repelling layer 6 may cover the first dielectric layer as illustrated in FIG. 1 and FIG. 2, or needs not cover the first dielectric layer.

Figure 5:
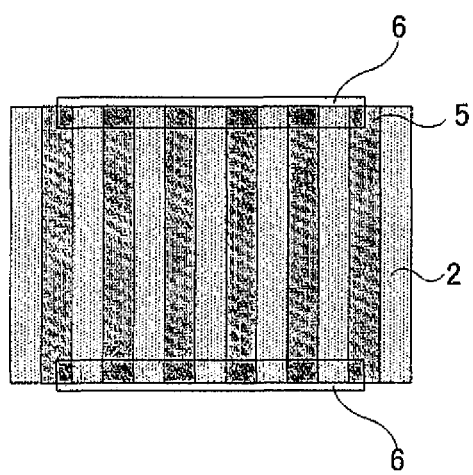
FIG. 5 is a schematic top view of an example of an inorganic polarizing plate of the present invention.

FIG. 5 is a schematic top view of an example of the inorganic polarizing plate of the present invention.

Figure 6:
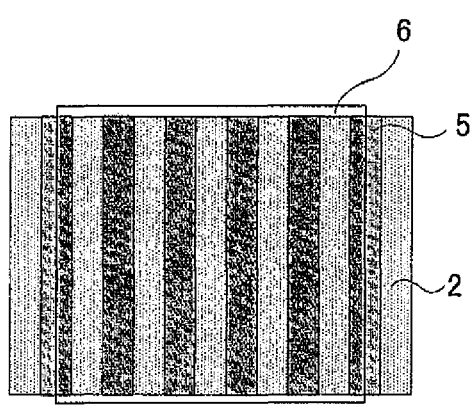
FIG. 6 is a schematic top view of another example of an inorganic polarizing plate of the present invention.

FIG. 6 is a schematic top view of another example of the inorganic polarizing plate of the present invention.

Figure 7:
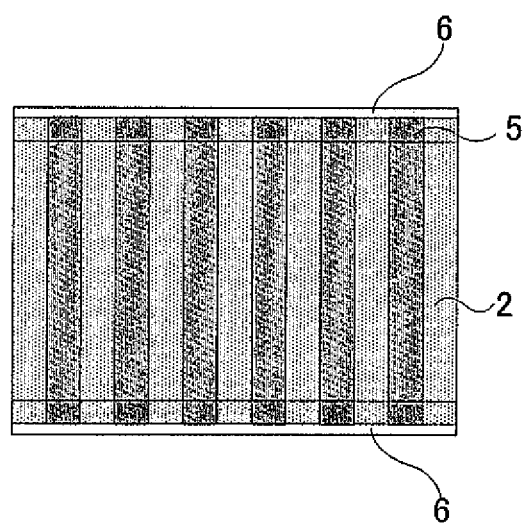
FIG. 7 is a schematic top view of another example of an inorganic polarizing plate of the present invention.

FIG. 7 is a schematic top view of another example of the inorganic polarizing plate of the present invention.

Figure 8:
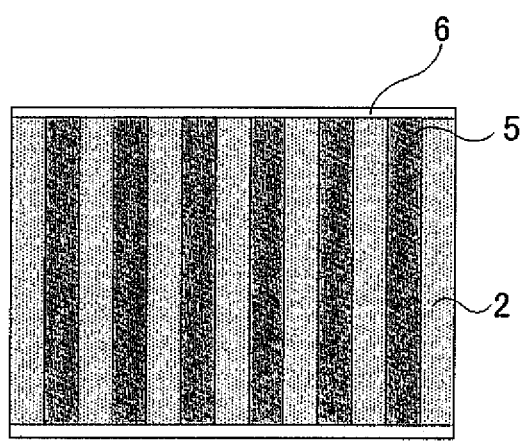
FIG. 8 is a schematic top view of another example of an inorganic polarizing plate of the present invention.

FIG. 8 is a schematic top view of another example of the inorganic polarizing plate of the present invention.

On the top surface of the inorganic polarizing plate having the side surface illustrated in FIG. 1 and FIG. 3, the water repelling layer 6 may cover only top surface portions at the peripheral ends of the inorganic polarizing plate at which the longer-direction ends of the linear metal layers 3 are present as illustrated in FIG. 5, or the water repelling layer 6 may cover the top surface from one to the other of the peripheral ends of the inorganic polarizing plate at which the longer-direction ends of the linear metal layers 3 are present as illustrated in FIG. 6.

Also on the top surface of the inorganic polarizing plate having the side surface illustrated in FIG. 2 and FIG. 4, the water repelling layer 6 may cover only top surface portions at the peripheral ends of the inorganic polarizing plate at which the longer-direction ends of the linear metal layers 3 are present as illustrated in FIG. 7, or the water repelling layer 6 may cover the top surface from one to the other of the peripheral ends of the inorganic polarizing plate at which the longer-direction ends of the linear metal layers 3 are present as illustrated in FIG. 8.

<Method for Producing Inorganic Polarizing Plate>

Next, an example of a method for producing the inorganic polarizing plate of the present invention will be described with reference to FIG. 9 and FIG. 10A to FIG. 10I.

Figure 9:
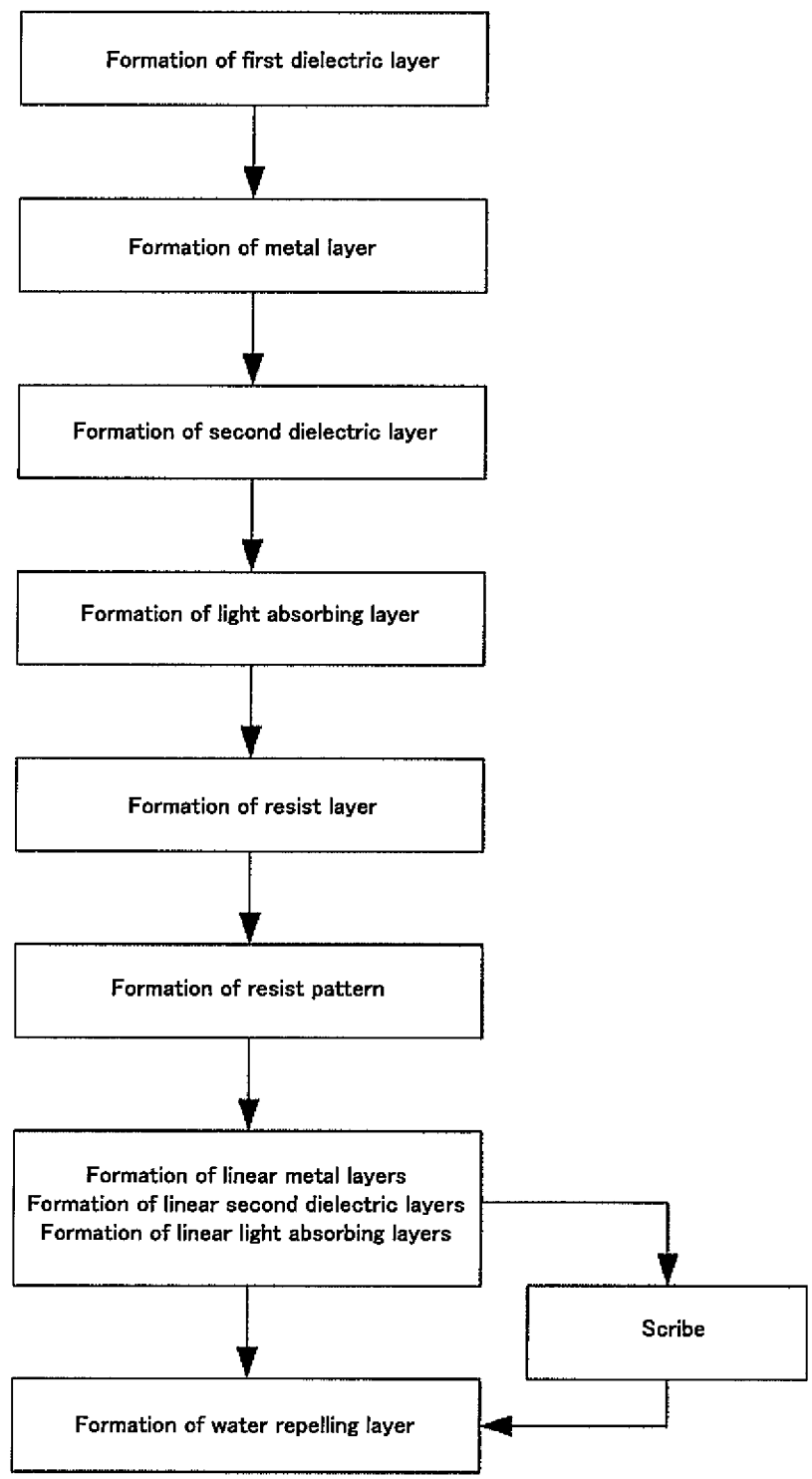
FIG. 9 is a flowchart of an example of a method for producing an inorganic polarizing plate of the present invention.

FIG. 9 is a flowchart of an example of the method for producing the inorganic polarizing plate of the present invention.

FIG. 10A to FIG. 10I are schematic views illustrating an example of the method for producing the inorganic polarizing plate of the present invention.

Figure 10A:
FIG. 10A is a schematic view illustrating an example of a method for producing an inorganic polarizing plate of the present invention (part 1)

First, a substrate 1 is prepared (FIG. 10A).

Figure 10B:
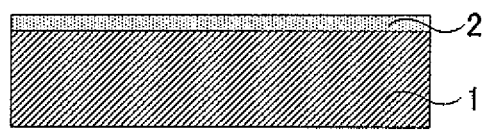
FIG. 10B is a schematic view illustrating an example of a method for producing an inorganic polarizing plate of the present invention (part 2)

Next, a first dielectric layer 2 is formed on the substrate 1 (FIG. 10B). The first dielectric layer 2 can be formed by, for example, a vapor deposition method and a sputtering method.

Figure 10C:
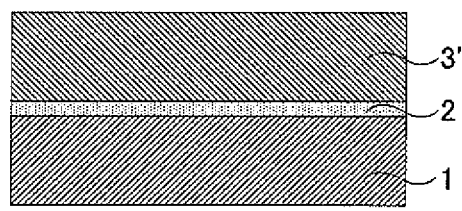
FIG. 10C is a schematic view illustrating an example of a method for producing an inorganic polarizing plate of the present invention (part 3)

Next, a metal layer 3' is formed on the first dielectric layer 2 (FIG. 10C). The metal layer 3' can be formed by, for example, a vapor deposition method and a sputtering method.

Figure 10D:
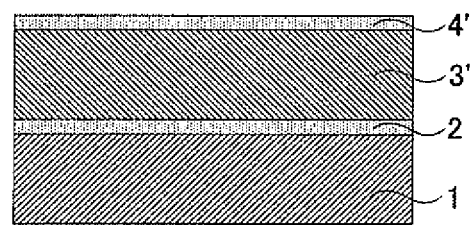
FIG. 10D is a schematic view illustrating an example of a method for producing an inorganic polarizing plate of the present invention (part 4)

Next, a second dielectric layer 4' is formed on the metal layer 3' (FIG. 10D). The second dielectric layer 4' can be formed by, for example, a vapor deposition method and a sputtering method.

Figure 10E:
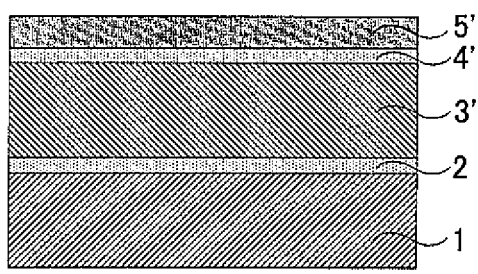
FIG. 10E is a schematic view illustrating an example of a method for producing an inorganic polarizing plate of the present invention (part 5)

Next, a light absorbing layer 5' is formed on the second dielectric layer 4' (FIG. 10E). The light absorbing layer 5' can be formed by, for example, a vapor deposition method and a sputtering method.

Figure 10F:
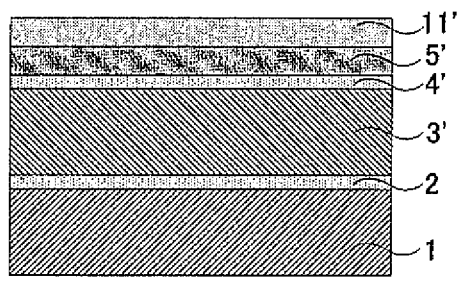
FIG. 10F is a schematic view illustrating an example of a method for producing an inorganic polarizing plate of the present invention (part 6)

Next, a resist layer 11' is formed on the light absorbing layer 5' (FIG. 10F). The material of the resist layer 11' is not particularly limited and may be appropriately selected depending on the intended purpose so long as the material can form a resist pattern having resistance to etching described below. Examples of the method for forming the resist layer 11' include a coating method.

Figure 10G:
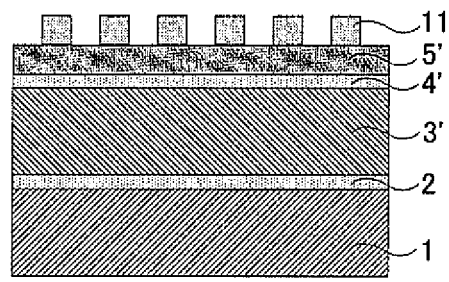
FIG. 10G is a schematic view illustrating an example of a method for producing an inorganic polarizing plate of the present invention (part 7)

Next, the resist layer 11' is exposed to light and developed, to form a resist pattern 11 (FIG. 10G).

Figure 10H:
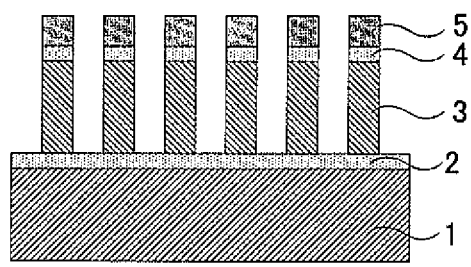
FIG. 10H is a schematic view illustrating an example of a method for producing an inorganic polarizing plate of the present invention (part 8)

Next, etching is performed using the resist pattern 11 as a mask, to form linear metal layers 3, linear second dielectric layers 4, and linear light absorbing layers 5 (FIG. 10H).

Next, optionally, the resultant is cut into a desired size with a scribing apparatus.

Figure 10I:
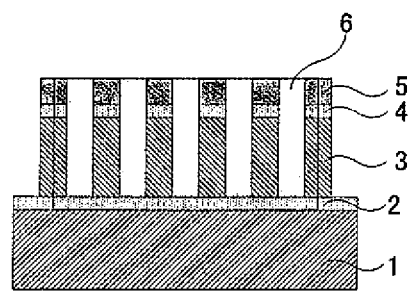
FIG. 10I is a schematic view illustrating an example of a method for producing an inorganic polarizing plate of the present invention (part 9)

Next, a water repelling layer 6 for covering the longer-direction ends of the linear metal layers 3, the linear second dielectric layers 4, and the linear light absorbing layers 5 is formed at peripheral ends of the inorganic polarizing plate at which the longer-direction ends of the linear metal layers 3 are present (FIG. 10I). The method for forming the water repelling layer 6 is not particularly limited and may be appropriately selected depending on the intended purpose.

In the way described above, the inorganic polarizing plate is produced.

Next, another example of the method for producing the inorganic polarizing plate of the present invention will be described with reference to FIG. 11, and FIG. 12A and FIG. 12B.

Figure 11:
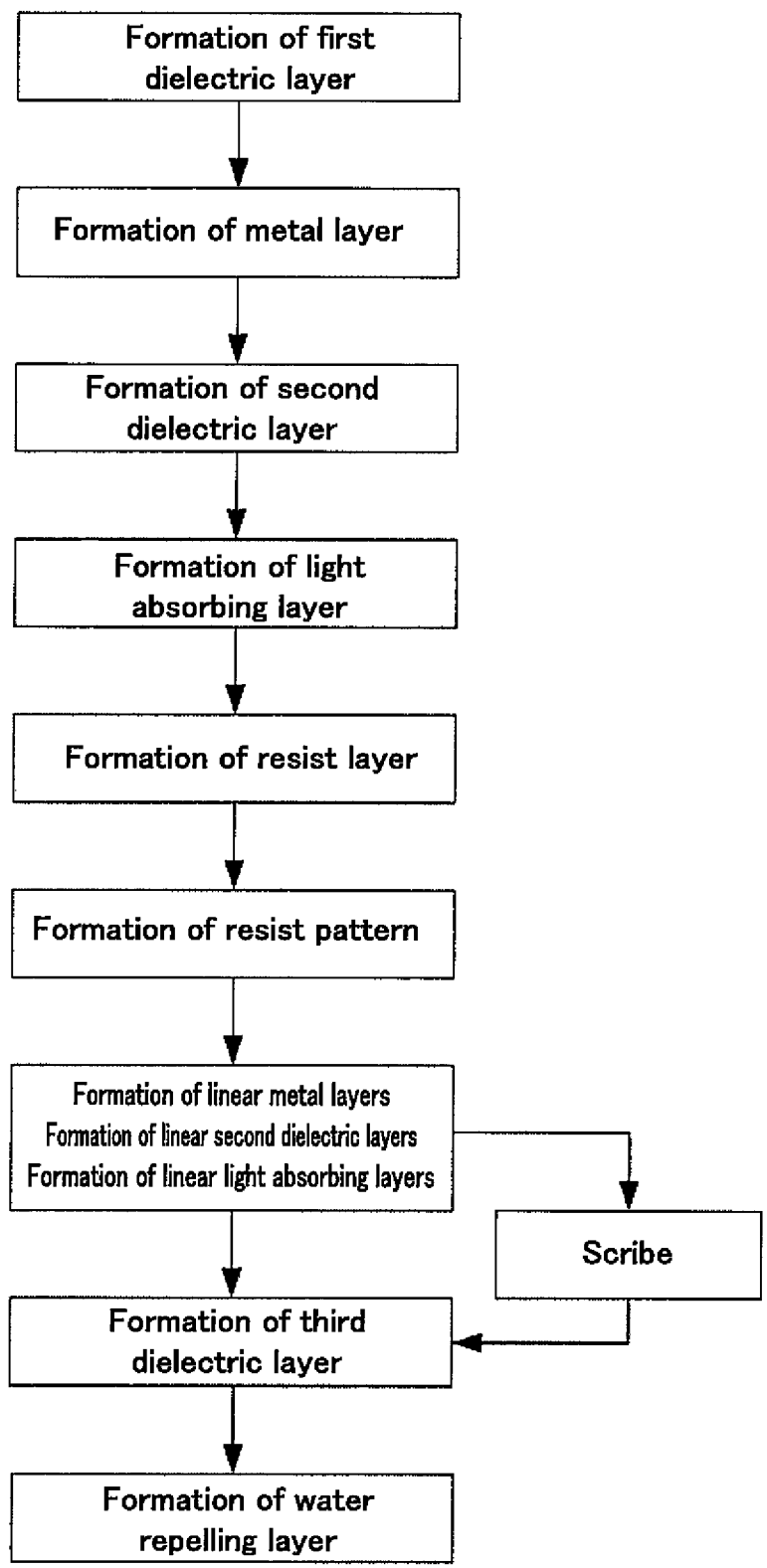
FIG. 11 is a flowchart of another example of a method for producing an inorganic polarizing plate of the present invention.

FIG. 11 is a flowchart of another example of the method for producing the inorganic polarizing plate of the present invention.

Figure 12A:
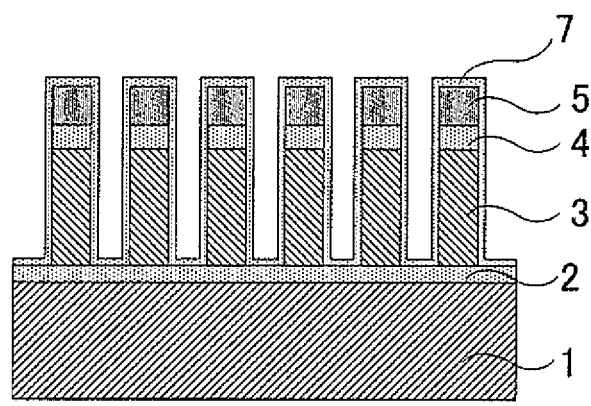
FIG. 12A is a schematic view illustrating another example of a method for producing an inorganic polarizing plate of the present invention (part 1)
Figure 12B:
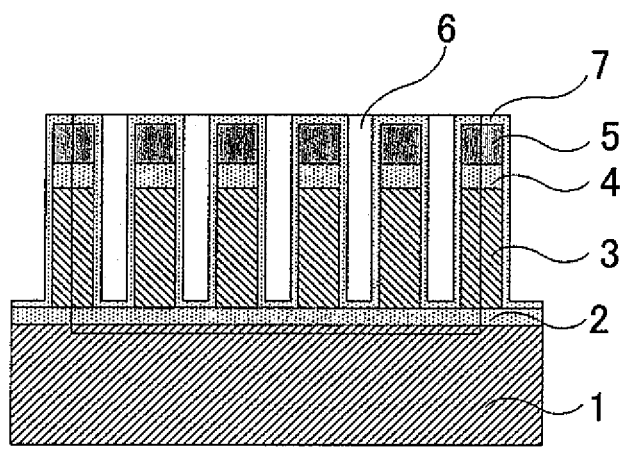
FIG. 12B is a schematic view illustrating another example of a method for producing an inorganic polarizing plate of the present invention (part 2)

FIG. 12A and FIG. 12B are schematic views illustrating another example of the method for producing the inorganic polarizing plate of the present invention.

The method is the same as in FIG. 9 and FIG. 10A to FIG. 10H, until which linear metal layers 3, linear second dielectric layers 4, and linear light absorbing layers 5 are formed by etching using a resist pattern 11 as a mask.

Next, optionally, the resultant is cut into a desired size with a scribing apparatus.

Next, a third dielectric layer 7 is formed on the exposed portions of the first dielectric layer 2, on the side surfaces of the linear metal layers 3, on the side surfaces of the linear second dielectric layers 4, and on the side surfaces and top surfaces of the linear light absorbing layers 5 (FIG. 12A). In this way, the third dielectric layer 7 is formed on facing side surfaces of the plurality of linear metal layers 3 and on the surface of the first dielectric layer 2 between the plurality of linear metal layers 3.

Next, a water repelling layer 6 for covering the longer-direction ends of the linear metal layers 3, the linear second dielectric layers 4, and the linear light absorbing layers 5 is formed at peripheral ends of the inorganic polarizing plate at which the longer-direction ends of the linear metal layers 3 are present (FIG. 12B).

In the way described above, the inorganic polarizing plate is produced.

Next, another example of the method for producing the inorganic polarizing plate of the present invention will be described with reference FIG. 13 and FIG. 14A to FIG. 14D.

Figure 13:
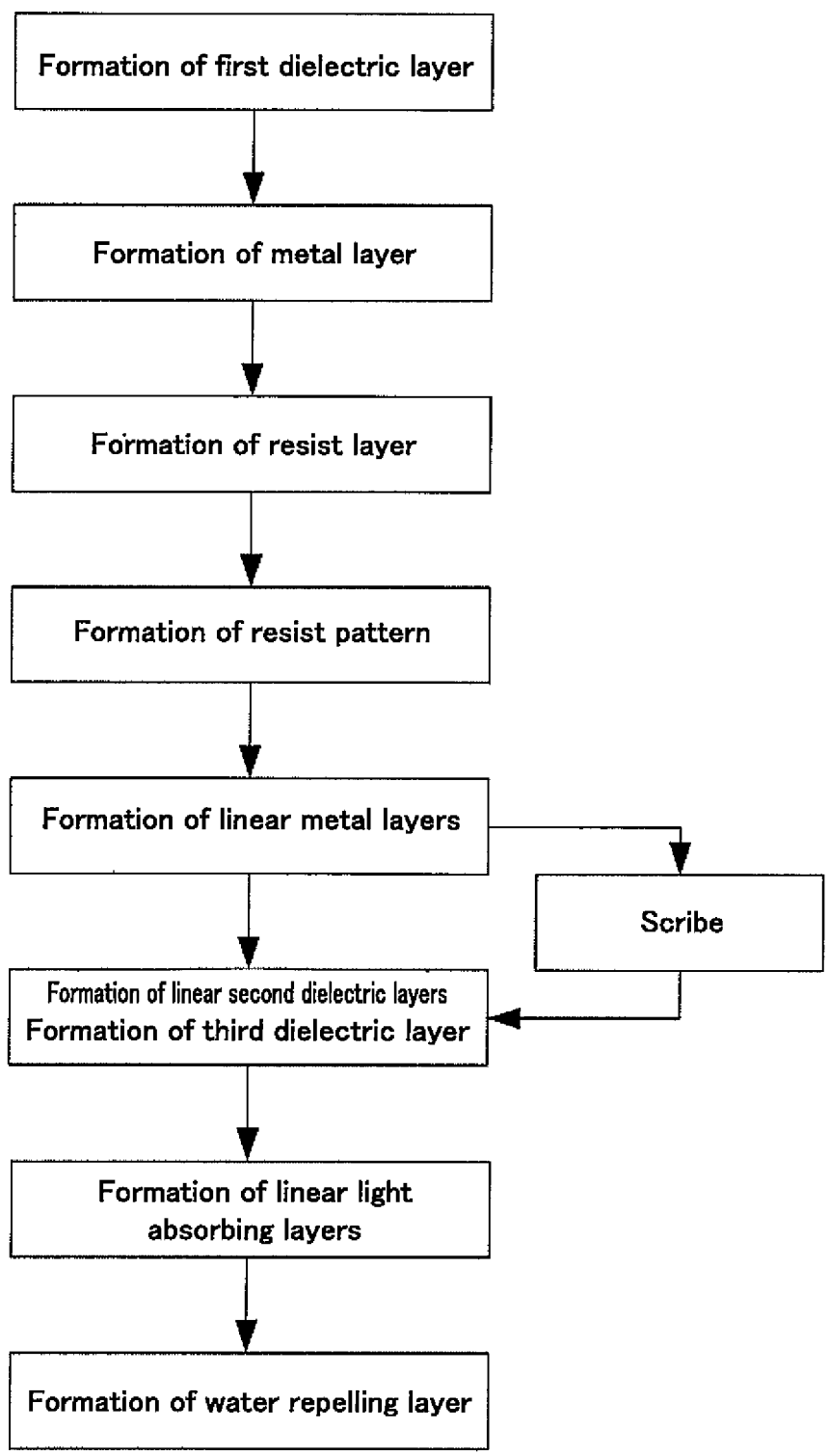
FIG. 13 is a flowchart of another example of a method for producing an inorganic polarizing plate of the present invention.

FIG. 13 is a flowchart of another example of the method for producing the inorganic polarizing plate of the present invention.

FIG. 14A to FIG. 14D are schematic views illustrating an example of the method for producing the inorganic polarizing plate of the present invention.

Figure 14A:
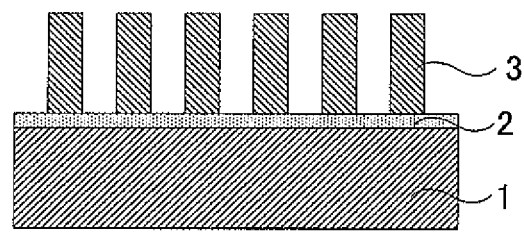
FIG. 14A is a schematic view illustrating another example of a method for producing an inorganic polarizing plate of the present invention (part 1)

First, a first dielectric layer 2, a metal layer, and a resist layer are formed in the order of reciting on a substrate 1 prepared. Subsequently, the resultant is exposed to light and developed, to form a resist pattern. Next, etching is performed using the resist pattern as a mask, to process the metal layer into desired linear metal layers 3 (FIG. 14A).

Next, optionally, the resultant is cut into a desired size with a scribing apparatus.

Figure 14B:
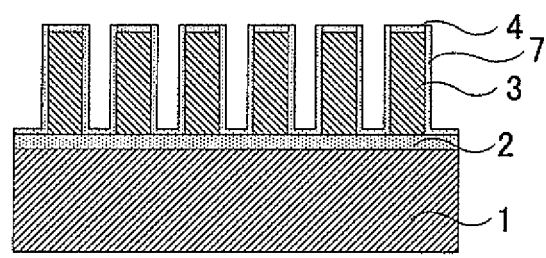
FIG. 14B is a schematic view illustrating another example of a method for producing an inorganic polarizing plate of the present invention (part 2)

Next, a dielectric layer is formed on the exposed portions of the first dielectric layer 2 and on the side surfaces and top surfaces of the linear metal layers 3 (FIG. 14B). In this way, the third dielectric layer 7 is formed on facing side surfaces of the plurality of linear metal layers 3 and on the surface of the first dielectric layer 2 between the plurality of linear metal layers 3. In the dielectric layer formed in FIG. 14B, the dielectric layer on the facing side surfaces of the plurality of linear metal layers 3 and on the surface of the first dielectric layer 2 between the plurality of linear metal layers 3 is referred to as third dielectric layer 7, and the dielectric layer on the top surfaces of the linear metal layers 3 is referred to as linear second dielectric layers 4.

Figure 14C:
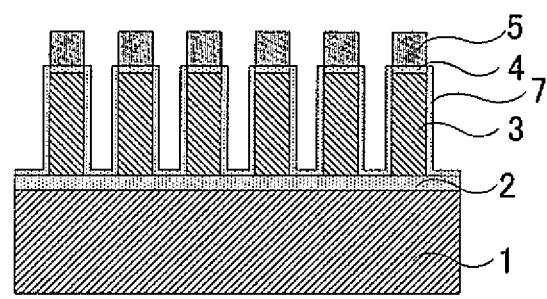
FIG. 14C is a schematic view illustrating another example of a method for producing an inorganic polarizing plate of the present invention (part 3)

Next, linear light absorbing layers 5 are formed on the linear second dielectric layers 4 (FIG. 14C).

Figure 14D:
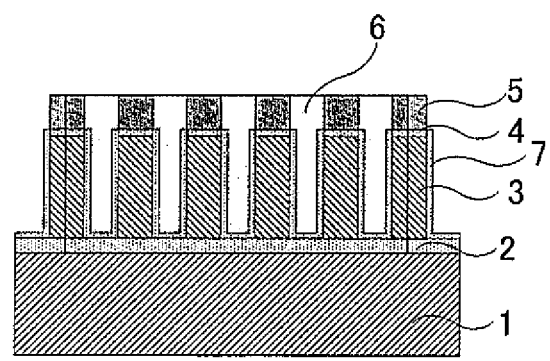
FIG. 14D is a schematic view illustrating another example of a method for producing an inorganic polarizing plate of the present invention (part 4)

Next, a water repelling layer 6 for covering the longer-direction ends of the linear metal layers 3, the linear second dielectric layers 4, and the linear light absorbing layers 5 is formed at peripheral ends of the inorganic polarizing plate at which the longer-direction ends of the linear metal layers 3 are present (FIG. 14D).

In the way described above, the inorganic polarizing plate is produced.

<Water Repelling Layer>

Next, the water repelling layer will be described in more detail.

Figure 15A:
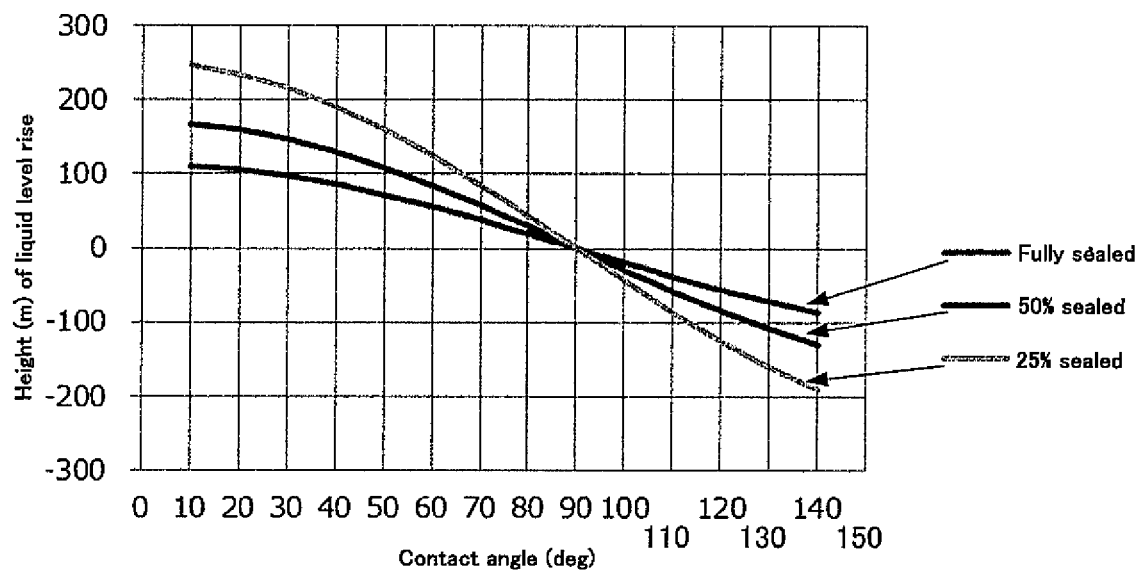
FIG. 15A plots the results of simulation of the height of liquid level rise caused by a capillary action.
Figure 15B:
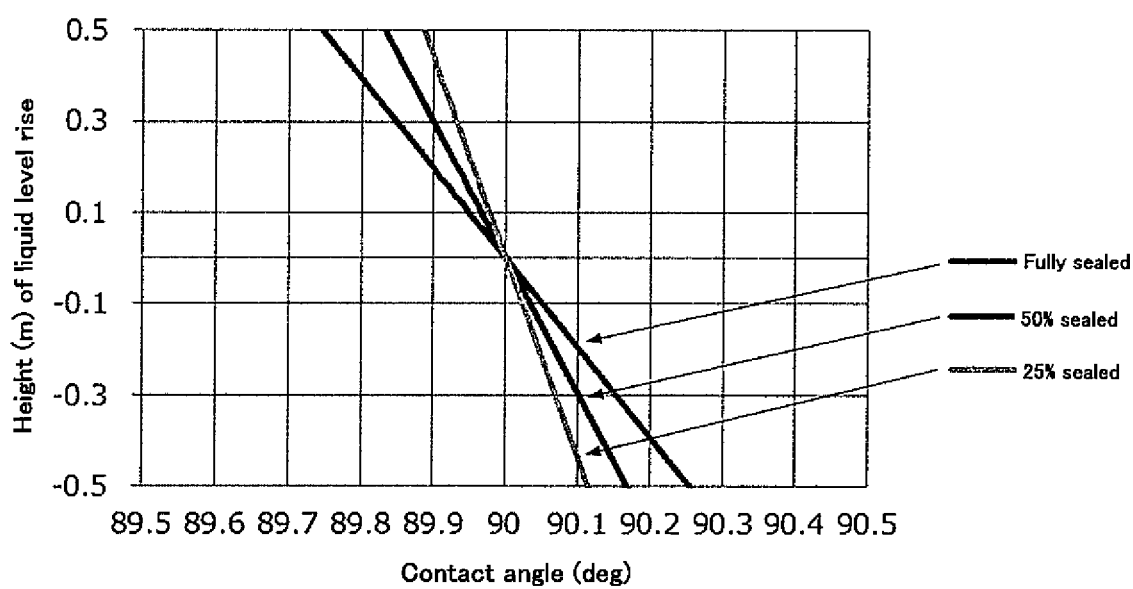
FIG. 15B plots the results of simulation of the height of liquid level rise caused by a capillary action.

FIG. 15A and FIG. 15B plot the results of simulation of the height of liquid level rise assumed to be caused in the grid structure of the inorganic polarizing plate of the present invention by a capillary action when water is the medium, relative to contact angle.

The height H (m) of liquid level rise in FIG. 15A and FIG. 15B can be calculated according to a formula below.

$$\text{Height } H \text{ of liquid level rise} = \frac{4 \cdot T \cdot \cos\theta}{\rho \cdot g \cdot d}$$

T represents surface tension (N/m). $\rho$ represents density (kg/m$^3$). g represents gravitational acceleration (m/s$^2$). d represents tube size (m). $\theta$ represents contact angle (°).

In FIG. 15A and FIG. 15B, "fully sealed", "50% sealed", and "25% sealed" are as follows.

Fully sealed: a state that the medium that has intruded into a void fills the void to the full of the grid height 50% sealed: a state that the medium that has intruded into a void fills the void to 50% of the grid height.

25% sealed: a state that the medium that has intruded into a void fills the void to 25% of the grid height.

From FIG. 15A and FIG. 15B, it is seen that when water is the medium, liquid level rise stops at the contact angle of about 90° regardless of the amount of the medium in the grid. Therefore, it is important to control the contact angle of the surface of the water repelling layer to 90° or greater.

The water repelling layer can be formed with a water repellent agent having a water contact angle of 90° or greater. In this case, for example, the sides of the inorganic polarizing plate at which the grid is opened is impregnated with the water repellent agent. Further, with combination of a dipping tank and a lifting mechanism, water repelling layers can be formed on many inorganic polarizing plates at a time.

Figure 16A:
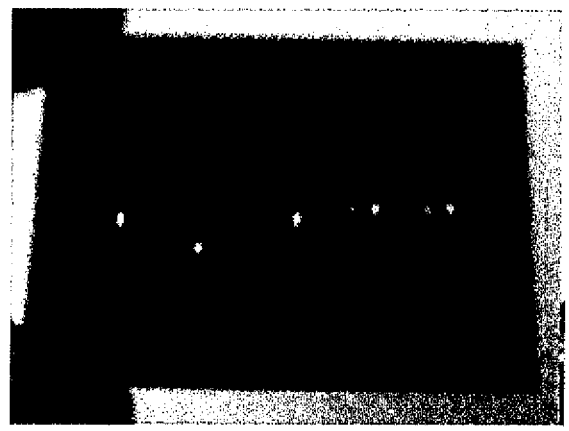
FIG. 16A is a picture illustrating a state of super water repellency.
Figure 16B:
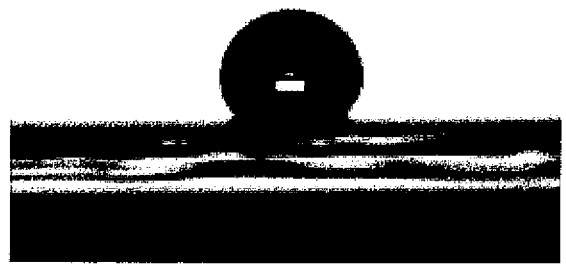
FIG. 16B is a picture illustrating a state of super water repellency.

When a water repellent agent having a super water repellency is used, the water contact angle of the water repellent agent is 125° or greater as illustrated in FIG. 16A and FIG. 16B. Therefore, a necessary water contact angle of 90° or greater can be secured. Further, when the embodiments in FIG. 2 and FIG. 4 including a water repelling layer on the entire surface of the inorganic polarizing plate having a laminated structure are used in, for example, projectors, the inorganic polarizing plate can be prevented in all direction from liquid contaminants that are to be introduced by a cooling wind caused by a cooling fan.

Examples of the position at which the water repelling layer is formed include the positions illustrated in FIG. 1 to FIG. 8.

As illustrated in FIG. 1 and FIG. 3, the water repelling layer needs not cover the longer-direction ends of the linear metal layers 3, the linear second dielectric layers 4, and the linear light absorbing layers 5 that are positioned at both ends of the sides of the inorganic polarizing plate defining the peripheral ends of the inorganic polarizing plate at which the longer-direction ends of the linear metal layers 3 are present. However, it is preferable that the uncovered portions be less than 0.5 mm from the both ends of the sides of the inorganic polarizing plate.

In order to confirm that a capillary action is prevented, there is a method of attaching, for example, sebum on the peripheral ends of the inorganic polarizing plate at which the longer-direction ends of the linear metal layers are present and observing the state of intrusion of, for example, the sebum in the grid grooves. For example, sebum is attached on the longer-direction ends of the linear metal layers of the inorganic polarizing plate of the present invention including a water repelling layer having a water contact angle of 90° or greater, and the inorganic polarizing plate is left to stand at normal temperature in a state that the inorganic polarizing plate is stood upright with the peripheral end on which the sebum is attached facing downward. A capillary action at the portion on which the sebum is attached is observed with an optical microscope, to observe temporal changes.

Figure 17:
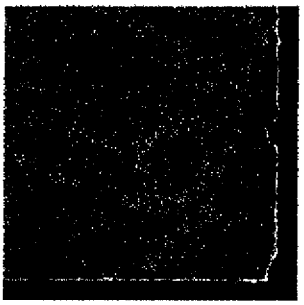
FIG. 17 illustrates the results of observation of sebum stains by a capillary action.
Figure 17:
Figure 17:
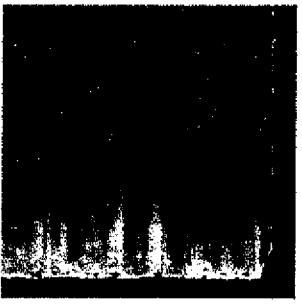
Figure 17:
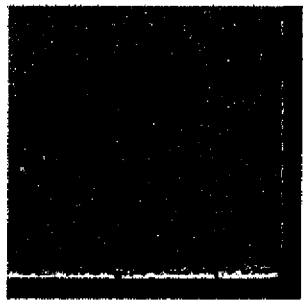
Figure 17:
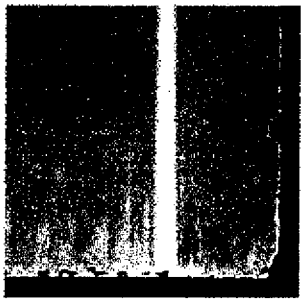
Figure 17:
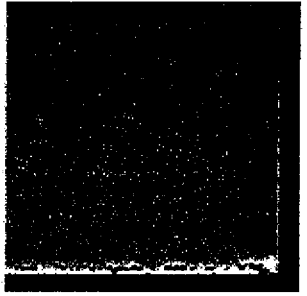

FIG. 17 illustrates actual observation of the temporal changes. Occurrence of a capillary action was observed from an inorganic polarizing plate having a water contact angle of from 20° through 30° immediately after the sebum stain was attached, and development of the capillary action was observed along with elapse of the time. On the other hand, a capillary action did not occur in the organic polarizing plate of the present invention including a water repelling layer having a water contact angle of 90° or greater, even past 21 hours.

When the inorganic polarizing plate is used in a projector, the temperature of the inorganic polarizing plate will be elevated to 150° C. or higher due to photothermal generation because light of the projector will be passing through the inorganic polarizing plate for a long time. It can be assumed that the components of the water repellent agent forming the water repelling layer may volatize in a high-temperature environment at a high temperature of 250° C. due to thermal decomposition, to lower the water contact angle to 30° or less, and the water repelling layer may lose its property. However, although light of a projector heats the inorganic polarizing plate at the same time as it passes through the center of the inorganic polarizing plate, the temperature at the peripheral ends of the inorganic polarizing plate does not rise to 250° C. Therefore, the water repelling layer will not lose its property.

Figure 18:
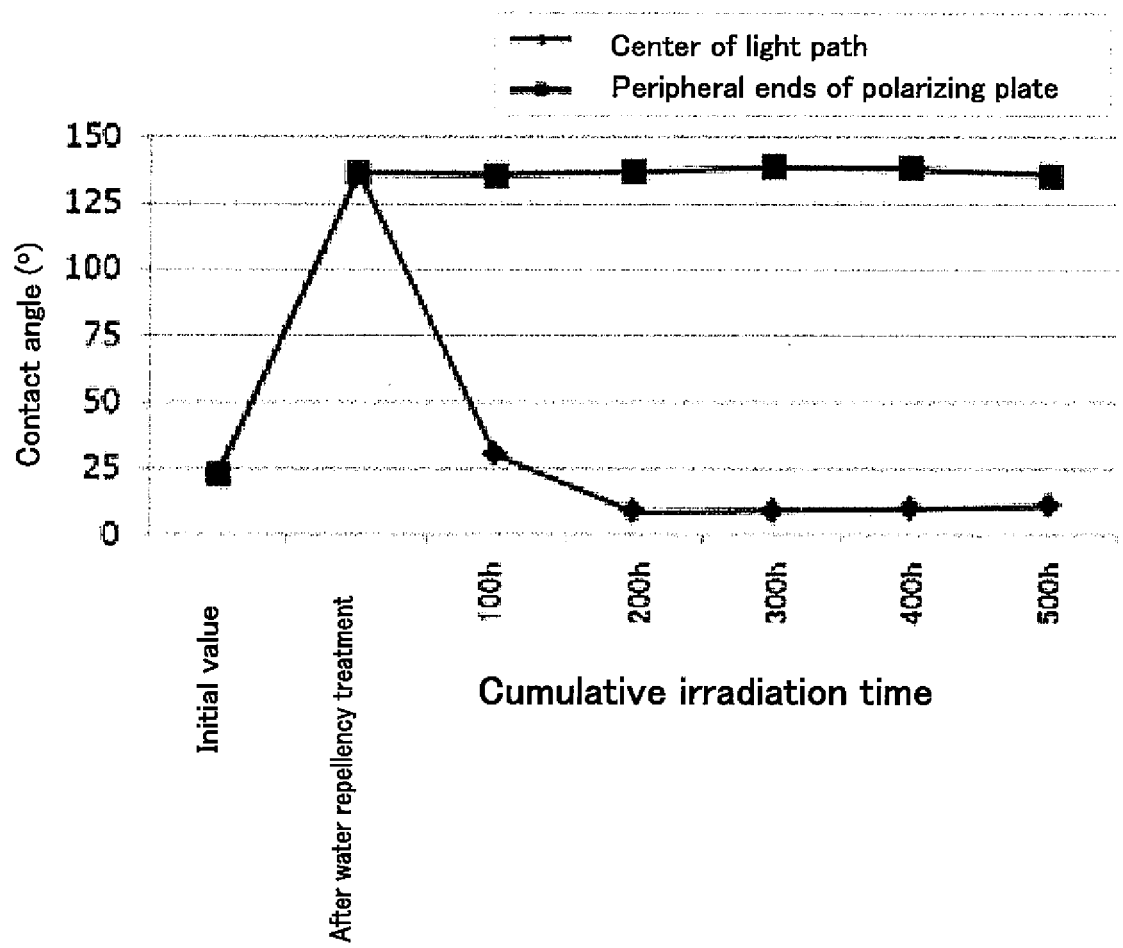
FIG. 18 is a graph plotting a relationship between a cumulative irradiation time and a contact angle.

FIG. 18 plots changes of water contact angles at the central portion and peripheral ends of the inorganic polarizing plate of the present invention relative to cumulative irradiation time, when the inorganic polarizing plate was mounted in a representative liquid crystal projector and a lamp was lit. In this experiment, the water repelling layer was formed also on the central portion of the inorganic polarizing plate in addition to the peripheral ends. That is, the inorganic polarizing plate having the side surface illustrated in FIG. 2 and the top surface illustrated in FIG. 8 was used.

Figure 19:
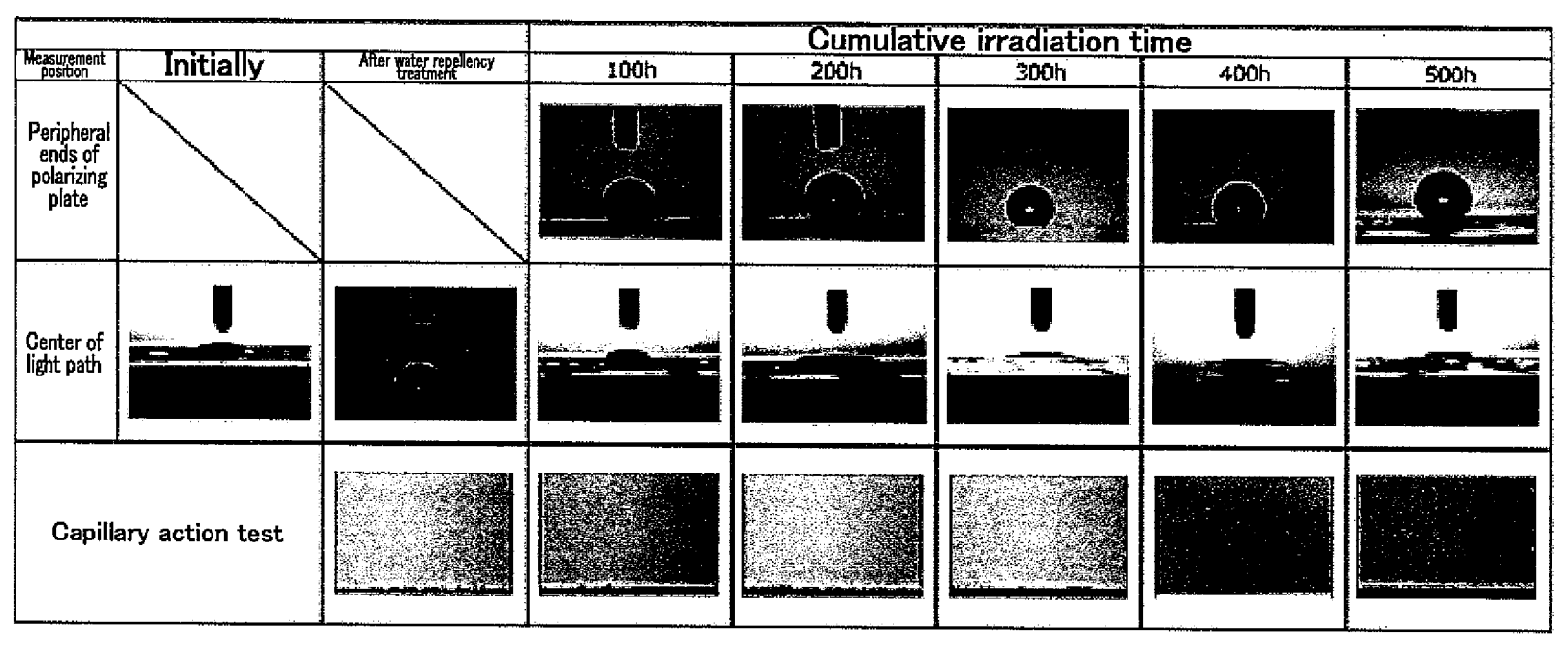

The water contact angle at the central portion of the inorganic polarizing plate lowered at every 100 hours along with the cumulative irradiation time. On the other hand, the contact angle at the peripheral ends of the inorganic polarizing plate that were not on the light path was kept to 135° or greater. Therefore, it was possible to maintain a water contact angle effective for a capillary action. As a result of confirming this effect by a capillary action test, as illustrated in FIG. 19, development of a capillary action did not occur even past cumulative 500 hours.

The material forming the water repelling layer is preferably an organopolysilazane. The organopolysilazane can form a water repelling layer having a water contact angle of 90° or greater, and has an excellent heat resistance. The organopolysilazane having an excellent heat resistance can suppress degradation of water repellency due to heat generation on the light path, which is the drawback with the use of a typical water repellent agent.

INDUSTRIAL APPLICABILITY

The inorganic polarizing plate of the present invention does not need a complicated production process and can suppress degradation of optical properties due to liquid stains that adhere to the peripheral ends. Therefore, the inorganic polarizing plate of the present invention can be suitably used in projectors.

REFERENCE SIGNS LIST

1: substrate
2: first dielectric layer
3: linear metal layers
3': metal layer
4: linear second dielectric layers
4': second dielectric layer
5: linear light absorbing layers
5': light absorbing layer
6: water repelling layer
6: first mask layer
7: third dielectric layer
11': resist layer
11: resist pattern

The invention claimed is:
1. An inorganic polarizing plate, comprising in an order of reciting:
   a substrate transparent to light in a bandwidth used;
   a first dielectric layer;
   a plurality of linear metal layers;
   a plurality of linear second dielectric layers; and
   a plurality of linear light absorbing layers,
   wherein the plurality of linear metal layers are arranged on the first dielectric layer in a manner that the plurality of linear metal layers are spaced at intervals shorter than a wavelength of the light,
   wherein the plurality of linear second dielectric layers are arranged on the plurality of linear metal layers, respectively,
   wherein the plurality of linear light absorbing layers are arranged on the plurality of linear second dielectric layers, respectively,
   wherein the inorganic polarizing plate comprises a water repelling layer on all peripheral ends of the inorganic polarizing plate, the peripheral ends being peripheral ends at which longer-direction ends of the linear metal layers are present, the water repelling layer covering all longer-direction ends of the linear metal layers, the linear second dielectric layers, and the linear light absorbing layers, except the long-direction ends of the linear metal layers, the linear second dielectric layers, and the linear light absorbing layers positioned on one or both ends of the sides of the inorganic polarizing plate defining the peripheral ends,
   wherein on the top surface of the inorganic polarizing plate, the water repelling layer covers only top surface portions at the peripheral ends of the inorganic polarizing plate at which the longer-direction ends of the linear metal layers are present, and wherein at least part of the water repelling layer is disposed within a region in which a polarizing function is utilized.

2. The inorganic polarizing plate according to claim 1, comprising
a third dielectric layer on facing side surfaces of the plurality of linear metal layers and on a surface of the first dielectric layer between the plurality of linear metal layers.

3. The inorganic polarizing plate according to claim 1, wherein a material of the linear metal layers is any one selected from the group consisting of Al, Ag, Cu, Mo, Cr, Ti, Ni, W, Fe, Si, Ge, Te, and an alloy of 2 or more thereof.

4. The inorganic polarizing plate according to claim 1, wherein a material of the first dielectric layer and the linear second dielectric layers is any one of $SiO_2$ and $Al_2O_3$.

5. The inorganic polarizing plate according to claim 1 wherein a material of the linear light absorbing layers is any one selected from the group consisting of Ta, Al, Ag, Cu, Mo, Cr, Ti, W, Ni, Fe, Sn, Si, and an alloy of 2 or more thereof.

6. The inorganic polarizing plate according to claim 1, wherein a water contact angle of the water repelling layer is 90° or greater.

7. The inorganic polarizing plate according to claim 1, wherein a material of the water repelling layer is an organopolysilazane.

8. The inorganic polarizing plate according to claim 1, wherein a material of the substrate is any one selected from the group consisting of glass, quartz crystal, and sapphire.

9. The inorganic polarizing plate according to claim 1, wherein the water repelling layer covers a top surface from one to the other of the peripheral ends of the inorganic polarizing plate at which the longer-direction ends of the linear metal layers are present.

10. The inorganic polarizing plate according to claim 1, wherein the water repelling layer does not cover the long-direction ends of the linear metal layers, the linear second dielectric layers, and the linear light absorbing layers positioned on one or both ends of the sides of the inorganic polarizing plate defining the peripheral ends.

11. An inorganic polarizing plate, comprising in an order of reciting:
a substrate transparent to light in a bandwidth used;
a first dielectric layer;
a plurality of linear metal layers;
a plurality of linear second dielectric layers; and
a plurality of linear light absorbing layers,
wherein the plurality of linear metal layers are arranged on the first dielectric layer in a manner that the plurality of linear metal layers are spaced at intervals shorter than a wavelength of the light,
wherein the plurality of linear second dielectric layers are arranged on the plurality of linear metal layers, respectively,
wherein the plurality of linear light absorbing layers are arranged on the plurality of linear second dielectric layers, respectively,
wherein the inorganic polarizing plate comprises a water repelling layer on peripheral ends of the inorganic polarizing plate, the peripheral ends being peripheral ends at which longer-direction ends of the linear metal layers are present, the water repelling layer covering longer-direction ends of the first dielectric layer side of the substrate to the opposite side of the substrate, the first dielectric layer, the linear metal layers, the linear second dielectric layers, and the linear light absorbing layers, and
wherein at least part of the water repelling layer is disposed within a region in which a polarizing function is utilized.

12. The inorganic polarizing plate according to claim 11, comprising
a third dielectric layer on facing side surfaces of the plurality of linear metal layers and on a surface of the first dielectric layer between the plurality of linear metal layers.

13. The inorganic polarizing plate according to claim 11, wherein a material of the linear metal layers is any one selected from the group consisting of Al, Ag, Cu, Mo, Cr, Ti, Ni, W, Fe, Si, Ge, Te, and an alloy of 2 or more thereof.

14. The inorganic polarizing plate according to claim 11, wherein a material of the first dielectric layer and the linear second dielectric layers is any one of $SiO_2$ and $Al_2O_3$.

15. The inorganic polarizing plate according to claim 11, wherein a material of the linear light absorbing layers is any one selected from the group consisting of Ta, Al, Ag, Cu, Mo, Cr, Ti, W, Ni, Fe, Sn, Si, and an alloy of 2 or more thereof.

16. The inorganic polarizing plate according to claim 11, wherein a water contact angle of the water repelling layer is 90° or greater.

17. The inorganic polarizing plate according to claim 11, wherein a material of the water repelling layer is an organopolysilazane.

18. The inorganic polarizing plate according to claim 11, wherein a material of the substrate is any one selected from the group consisting of glass, quartz crystal, and sapphire.

19. The inorganic polarizing plate according to claim 11, wherein the water repelling layer covers a top surface from one to the other of the peripheral ends of the inorganic polarizing plate at which the longer-direction ends of the linear metal layers are present.

20. The inorganic polarizing plate according to claim 11, wherein the water repelling layer does not cover the long-direction ends of the linear metal layers, the liner second dielectric layers and the linear light absorbing layers positioned on one or both ends of the sides of the inorganic polarizing plate defining the peripheral ends.

* * * * *